UNITED STATES PATENT OFFICE.

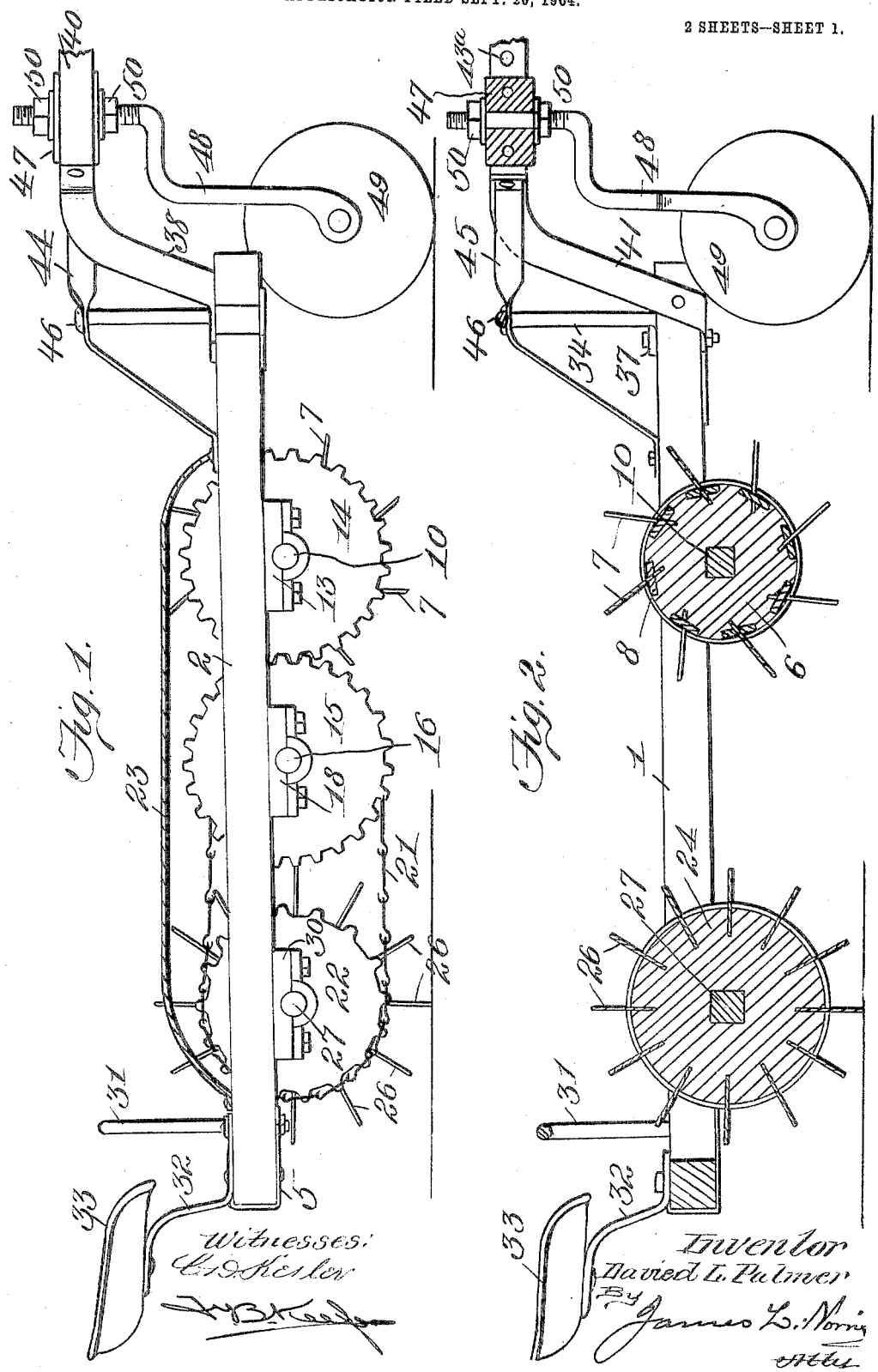

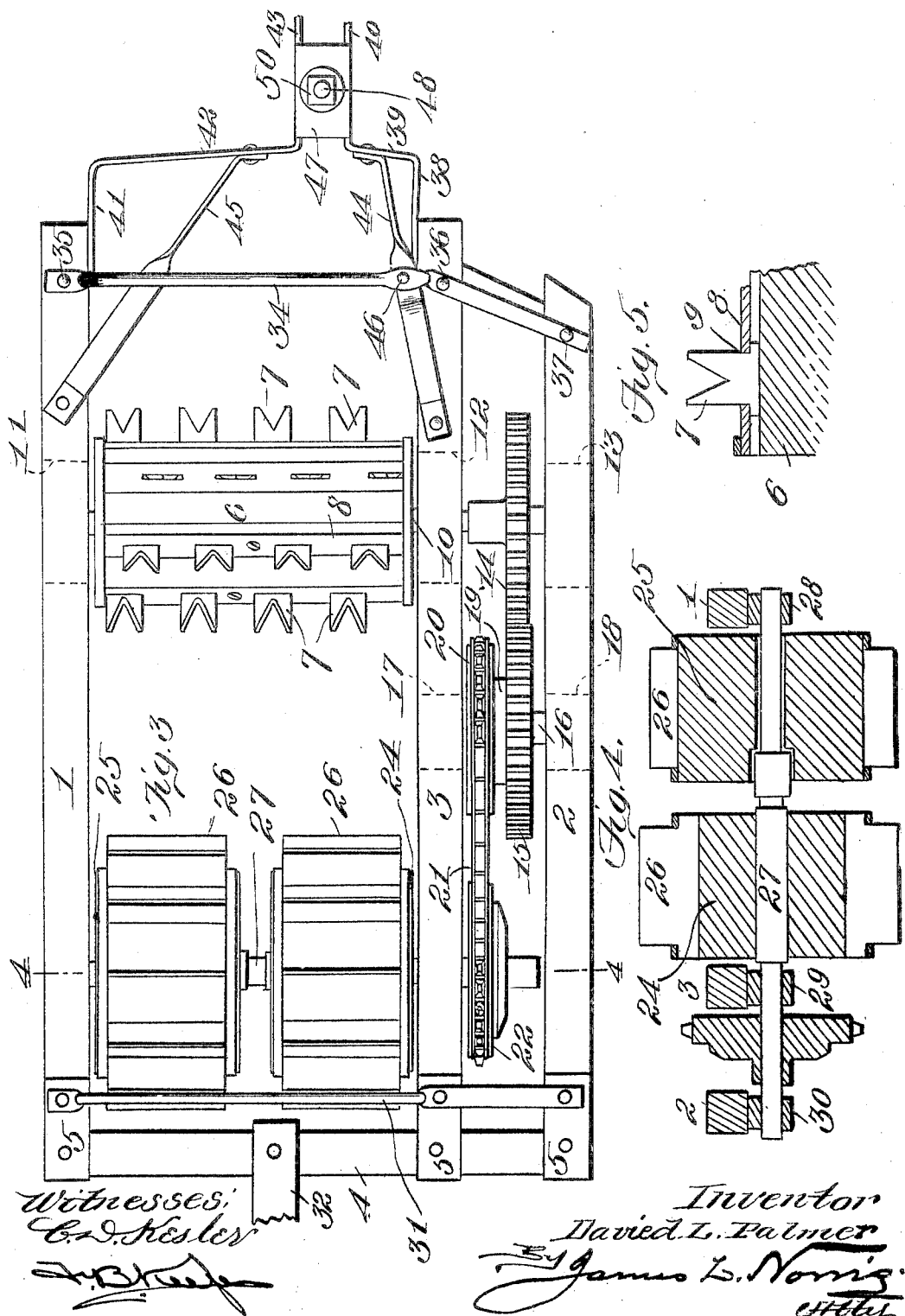

DAVIED LAFAYETT PALMER, OF MADISON, FLORIDA.

COMBINED STALK PULLER AND CUTTER.

No. 802,310. Specification of Letters Patent. Patented Oct. 17, 1905.

Application filed September 26, 1904. Serial No. 226,089.

To all whom it may concern:

Be it known that I, DAVIED LAFAYETT PALMER, a citizen of the United States, residing at Madison, in the county of Madison and State of Florida, have invented new and useful Improvements in a Combined Stalk Puller and Cutter, of which the following is a specification.

This invention relates to a combined stalk puller and cutter; and the object thereof is to construct an agricultural machine of such class which shall be simple in its construction, strong, durable, efficient in its use, and comparatively inexpensive to set up.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, and wherein like reference characters denote corresponding parts thereof and the several views, in which—

Figure 1 is a side elevation of a machine of the class referred to constructed in accordance with this invention. Fig. 2 is a longitudinal sectional view thereof. Fig. 3 is a plan; Fig. 4, a transverse section on line 4 4 of Fig. 3, and Fig. 5 is a sectional detail showing the manner of securing the pullers to their drum.

Referring to the drawings by reference characters, the machine embodies a frame consisting of three longitudinally-extending bars. (Designated by the reference characters 1, 2, and 3.) The bars 1 and 2 are termed the "outer" bars and the bar 3 the "intermediate" bar, the latter being arranged nearer the bar 2 than the bar 1. One end of the bars 1 2 3 is fixedly secured to the horizontally-extending end bar 4 by the holdfast devices 5.

Arranged and operating between the bars 1 3 is the pulling means and the cutting means, both of which constitute a part of the invention. The pulling means is arranged near the front end of the bars 1 2 and consists of a drum 6, carrying a series of rows of pullers 7. These latter are arranged upon the drum 6 in staggered relation with respect to each other and are substantially V-shaped with beveled edges. The pullers 7 are secured to the drum 6 through the medium of horizontally-extending bars 8, a bar 8 for each row of pullers 7, and the said bars 8 are fixedly secured to the drum 6 and are provided with openings 9, through which extend the pullers 7. The drum 6 is carried by a rotatable shaft 10, which finds bearings in the boxes 11, 12, and 13, the box 11 being secured to the underneath face of the bar 1, the box 12 being secured to the underneath face of the bar 3 and the box 13 to the underneath face of the bar 2, the shaft 10 being of such length as to extend from the bar 1 to the bar 2. Mounted between the bars 2 and 3 is a gear-wheel 14, adapted to be rotated when the machine has motion applied thereto and when rotated revolves the shaft 10, which, carrying the drum 6 therewith, causes the operation of the pullers 7. It may be well to state that the pullers 7 extend at an angle of thirty-five degrees with respect to the axis of the drum 6. Such an arrangement facilitates the operation of the pullers during the act of pulling the stalk. The gear-wheel 14 is operated through the medium of a gear-wheel 15, fixed upon a rotatable short shaft 16, which finds bearings in the boxes 17 and 18, carried on the underneath face of the bars 2 and 3. The shaft 16 is operated through the medium of a sprocket-wheel 20, carried thereby and separated from the wheel 15 through the medium of the disk 19, and said sprocket-wheel 20 is operated by means of an endless chain 21, engaging and operated by a sprocket-wheel 22, carried by a rotatable shaft, upon which is mounted the revoluble cutting means. The shaft which carries the cutting means and said cutting means will be hereinafter referred to. When motion is imparted to the machine, the cutting means is revolved, carrying the shaft therewith, which will impart motion to the sprocket-wheel 22, the latter operating the chain 21, the latter operating the sprocket-wheel 20, which in turn will rotate the shaft 16 and gear-wheel 15, and as the latter meshes with the gear-wheel 14, as well as rotates it, the shaft 10 will be revolved, thereby operating the pullers 7. The gear and sprocket wheels are inclosed by a suitable casing, which is indicated by the reference character 23.

The cutting means is arranged at the rear of the frame and consists of a pair of drums or cylinders 24 25. These drums or cylinders 24 25 are interposed between the bars 1 and 3 and are each provided with a series of radially-extending cutting-blades 26 of a length substantially equal to that of their respective drum or cylinder. The drum 24 is fixed upon the rotatable shaft 27, and the drum 25 is loosely mounted upon the shaft 27. The shaft 27 finds bearings in the boxes 28, 29, and 30, the box 28 being suspended from the underneath face of the bar 1, the box 29 being suspended from the underneath face of the bar 3, and the box 30 being suspended from the underneath face of the bar 2. The sprocket-wheel 22 is mounted upon that part of the shaft 27 which is arranged between the bars 2 and 3. By providing the two drums in the manner set forth it has been found to obtain a more satisfactory working.

At the rear of the frame of the machine and upon the upper face thereof is arranged a dashboard 31 to protect the driver, and at the rear of said dashboard 31 the seat-post 32 is secured to the frame, and said seat-post 32 carries the seat 33.

The forward end of the machine is open, and the bars which constitute the frame are connected together through the medium of an arch-shaped brace member 34, secured, as at 35, to the forward end of the bar 1, as at 36 to the forward end of the bar 3, and, as at 37, to the forward end of the bar 2. By such an arrangement the bars upon that portion of the shaft 10 which extends between 1, 2, and 3 are connected together at their forward ends. Secured to the forward end of the bars 2 3, at the lower face thereof, is an upwardly and forwardly extending support 38, which has a portion of its length bent inwardly, as at 39, and then forwardly, as at 40, to form one of the hounds. Secured to the underneath face of the forward end of the bar 1 and projecting upwardly and forwardly is the support 41, having a portion of its length bent inwardly, as at 42, and then forwardly, as at 43, to form the other of the hounds. The support 41 is substantially of the same contour as the support 38. That portion of the supports 38 and 41 which forms the hounds is provided with apertures 43 to permit of attaching the tongue of the machine thereto. The supports 38 and 41 are reinforced and braced through the medium of the members 44 and 45, the former being secured at its upper end to the portion 39 of the support 38 and at its lower end to the upper face of the bar 3, and the latter is secured at its forward end to a portion 42 of the support and at its lower end to the upper face of the bar 1. Intermediate the ends of members 44 45 they are fixedly secured, as at 46, to the horizontally-extending portion of the arch-shaped member 34. Between that portion of the supports 38 and 41 which form the hounds is fixedly secured an apertured block 47, through which extends the upper end of the goose-neck-shaped hanger 48 for the caster-wheel 49. The upper end of the hanger 48 is adjustably connected to the block 47 through the medium of the nuts 50. By such an arrangement the caster-wheel 49 can be vertically adjusted so as to tilt the frame, consequently bringing the pulling means closer or away from the ground as occasion requires.

From the foregoing description and illustration it is thought that the operation of the machine can be readily understood; but it will be stated that when the machine moves in forward direction the pulling means pulls the stalks and throws them in the path of the cutting means, and the latter cuts the stalk. The manner in which the pulling means and cutting means are operated has heretofore been referred to.

It is thought the many advantages of a combined stalk puller and cutter constructed in accordance with the foregoing description, taken in connection with the accompanying drawings, can be readily understood, and it will furthermore be evident that changes, variations, and modifications can be resorted to without departing from the spirit of the invention or sacrificing any of the advantages thereof, and I therefore do not wish to restrict myself to the details of construction hereinbefore described and as shown in the accompanying drawings, but reserve the right to make such changes, variations, and modifications as come properly within the scope of the protection prayed.

Having thus fully described my invention, what I claim, and desire to secure by Letters Patent, is—

1. An agricultural machine of the character described, embodying a stalk-pulling means consisting of a rotatable member provided with a series of peripheral grooves, pulling members mounted in said grooves and provided with shoulders, said pulling members in one groove mounted in a staggered manner with respect to the pulling members in the adjacent groove, and a bar secured over each of said grooves and adapted to engage the shoulders of the pulling members for securing said members in position.

2. An agricultural machine of the character described, embodying a stalk-pulling means consisting of a rotatable member provided with a series of peripheral grooves, beveled V-shaped pulling members mounted in said grooves and provided with shoulders, said pulling members in one groove mounted in a staggered manner with respect to the pulling members in the adjacent groove, and a bar secured over each of said grooves and adapted to engage the shoulders of the pulling members for securing said members in position.

3. An agricultural machine of the character described, embodying a stalk-pulling means consisting of a rotatable member provided with a series of peripheral grooves, rearwardly-projecting members mounted in said grooves and provided with shoulders, said pulling members in one groove mounted in a staggered manner with respect to the pulling members in the adjacent groove, and a bar secured over each of said grooves and adapted to engage the shoulders of the pulling members for securing said members in position.

4. An agricultural machine of the character described involving a stalk-pulling means, a stalk-cutting means traveling upon the ground and adapted to be rotated when the machine travels, and a gearing operated by said cutting means and connected with the pulling means for operatively connecting said stalk-pulling and stalk-cutting means together so as to cause the simultaneous operation of the stalk-pulling means with the stalk-cutting means.

In testimony whereof I have hereunto set my hand in presence of two subscribing witnesses.

DAVIED LAFAYETT PALMER.

Witnesses:
ABIAL WINN,
A. T. MACINTYRE.